United States Patent [19]

Kostorz

[11] Patent Number: 4,698,858
[45] Date of Patent: Oct. 13, 1987

[54] SINGLE HOLE MIXING FAUCET

[75] Inventor: Jan R. Kostorz, Menden, Fed. Rep. of Germany

[73] Assignee: Friedrich Grohe Armaturenfabrik GmbH & Co., Hemer, Fed. Rep. of Germany

[21] Appl. No.: 309,769

[22] Filed: Oct. 8, 1981

[30] Foreign Application Priority Data

Oct. 11, 1980 [DE] Fed. Rep. of Germany ....... 3038452

[51] Int. Cl.⁴ ............................................. F16K 11/02
[52] U.S. Cl. ............................................ 4/192; 4/194; 4/195; 137/801
[58] Field of Search .................................... 4/191–204, 4/205; 137/625.4, 625.17, 801

[56] References Cited

U.S. PATENT DOCUMENTS 3,419,919  1/1969  Stayner ................................... 4/203
3,893,482  7/1975  Loose ............................. 137/625.17

FOREIGN PATENT DOCUMENTS 2153110  2/1971  Fed. Rep. of Germany .......... 4/191
 889057  2/1962  United Kingdom .

OTHER PUBLICATIONS

*Journal of Plumbing and Heating and Air Conditioning,* Feb. 1967, p. 4, "Introducing Vance Univalve".

Primary Examiner—Stephen Marcus
Attorney, Agent, or Firm—Karl F. Ross; Herbert Dubno

[57] ABSTRACT

A mixing faucet of the single hole mounting type and having a swivelable discharge arm includes an actuating linkage for a drain valve which is swivelable with the drain arm.

3 Claims, 1 Drawing Figure

U.S. Patent     Oct. 13, 1987     4,698,858
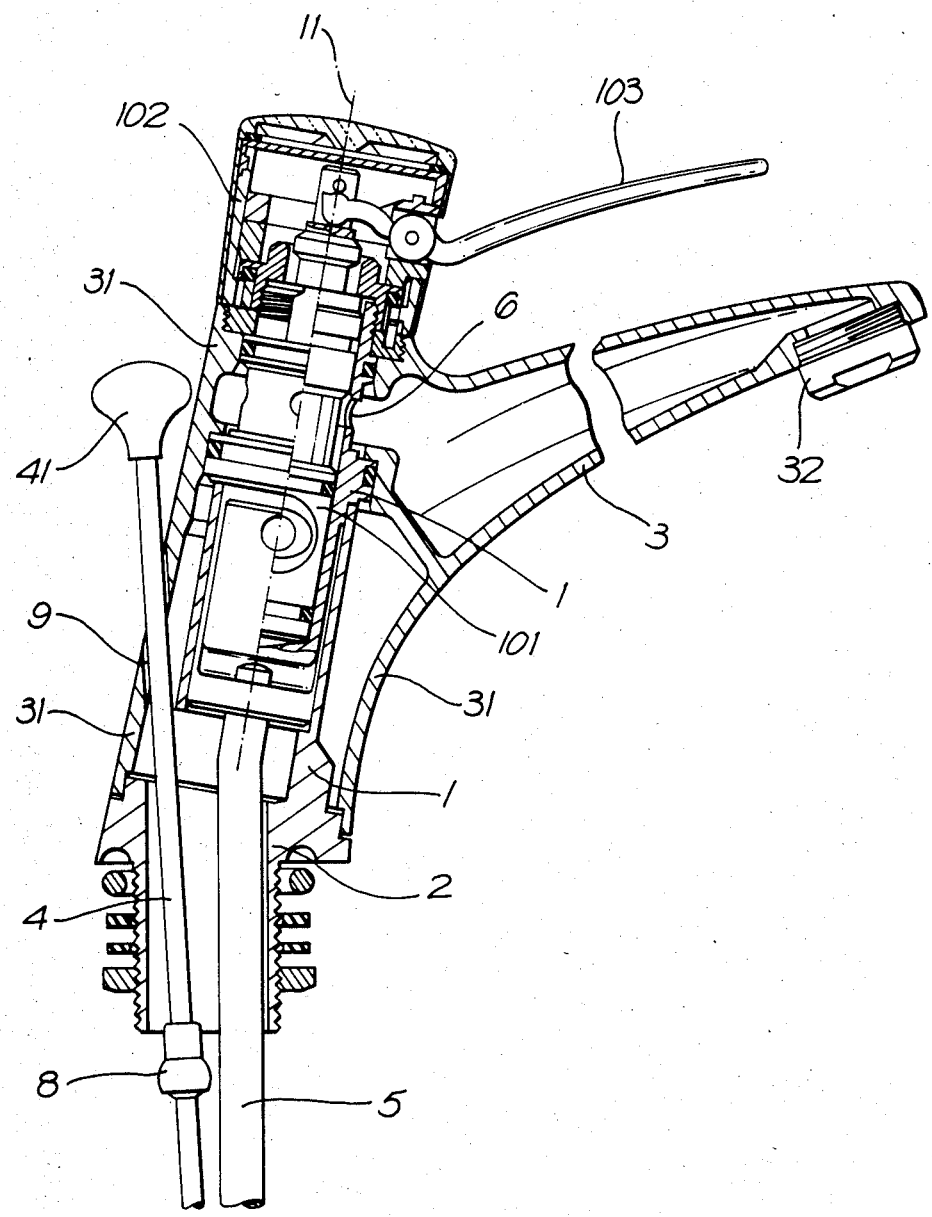

SINGLE HOLE MIXING FAUCET

BACKGROUND OF THE INVENTION

This invention pertains to single hole mountable mixing faucets for washbasins and the like.

Single hole mixing faucets are known which include a hollow mounting base on a valve body through which connecting pipes and an actuating linkage for a drain valve in the washbasin are passed and which further include a discharge arm swivelable about a swivel axis.

With these devices however it is necessary to provide the sanitary pipe fittings with a fixed base section projecting out of the washbasin and to locate the actuating device for the linkage of the washbasin drain valve nearby. The swivel outlet can be positioned above the base section on the sanitary pipe fitting.

It is one object of the invention to simplify the single hole mixing battery described above and to design it so as to permit an optimum design.

SUMMARY OF THE INVENTION

A single hole mixing valve in accordance with the invention has a discharge arm which surrounds a valve body and the actuating linkage extends out of the assembly through a guide hole in discharge arm such that the linkage and discharge arm swivel together.

An arrangement in accordance with the invention permits optimum styling of the visibly located pipe fitting sections so that the drain valve actuating facility can be realized with the simplest possible means.

In an embodiment of the invention, the drain valve actuating device is a pull rod accommodated in the guide hole positioned approximately vertically in the cylindrical portion of the discharge arm whereby the deflection occurring during swivel motion is compensated for by suitable allowed clearance in the guide hole. To permit deflection of the actuating linkage a ball and socket joint is interposed in the linkage in the region of the mounting base. The section of the linkage accommodated by the pipe fitting housing can alternatively be made of an elastically flexible material. It is then possible to save using a separate ball and socket joint.

BRIEF DESCRIPTION OF THE DRAWINGS

A design example of the invention is shown by means of a longitudinally sectioned single handle mixing valve in the drawing and is described in detail below.

DETAILED DESCRIPTION

The single handle mixing valve includes a valve body 1 in which is inserted a valve unit taking the form of a cartridge 101. The valve unit can be operated by an operating lever 103 with a valve top 102 rotatably located on valve body 1.

The valve body has a hollow mounting base 2 with mounting hardware for mounting on a washbasin etc. Through the hollow mounting base 2 are passed the connecting pipes 5 for hot and cold water as well as an actuating linkage 4 for a drain valve in the washbasin which is not shown in the drawing. Above the valve body a discharge arm 3 sealed with cylindrical guides is mounted on valve body 1 so as to swivel about an inclined swivel axis 11. The discharge arm 3 in the area of the valve body takes the form of a cylindrical section which surrounds the entire body 1. On the side of the cylindrical portion 31 opposite to discharge arm 3 actuating linkage 4 is lead out of the pipe fitting with the necessary clearance in an approximately vertically positioned guide hole 9 and the end section of this linkage has an operating knob 41. So that the actuating linkage 4 can execute suitable deflection when discharge arm 3 is swivelled, a ball and socket joint 8 is interposed in the region of the mounting base 2. To permit satisfactory function of the pull rod the swivel range of the discharge arm is limited to stop elements not represented in detail in the drawing.

The mixing valve represented has the following principle of operation:

with operating level 103 it is possible by means of upward or downward movement to determine the rate of flow of the water discharged from the discharge arm 3 through an outlet nozzle 32, whilst the mixture ratio and the water mixture temperature of the water emerging can be determined by swivelling about swivel axis 11. The hot and cold water supplied in connecting pipes 5 is introduced separately into cartridge 101 and passes as mixed water out of passages 6 in valve body 1 into discharge arm 3 which surrounds this section of the valve body sealed with seal rings 7. The bottom section of cylindrical portion 31 is not impinged upon by the water and serves particularly to accommodate actuating linkage 4. When with the aid of operating knob 41 the actuating linkage 4 is pulled out of the pipe fitting, the drain valve in the washbasin not shown in the drawing is closed so that the water emerging from outlet nozzle 32 can be collected by the washbasin. The drain valve is opened by pushing actuating linkage 4 back into the pipe fitting.

What is claimed is:

1. A single hole mountable mixing faucet assembly for mixing hot and cold water and for controling a drain valve, said assembly comprising:
    a hollow mounting base;
    a valve unit supported on said base and coupleable to hot and cold water pipes extending through said base;
    valve control means coupled to said valve unit and rotatable about a swivel axis for controlling said valve unit;
    a discharge arm supported by said mounting base and rotatable about said swivel axis;
    said discharge arm including a guide hole;
    a drain valve actuating linkage extending through said guide hole, said linkage including a flexible joint whereby said linkage swivels about said joint when said discharge arm is rotated about said axis.

2. An assembly in accordance with claim 1 wherein said flexible joint is a ball joint in the region of said base.

3. An assembly in accordance with claims 1 or 2 wherein said axis forms an angle with the vertical.

* * * * *